UNITED STATES PATENT OFFICE.

FRITZ GÜNTHER, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

MANUFACTURE OF THYMOL.

1,412,937.              Specification of Letters Patent.       Patented Apr. 18, 1922.

No Drawing.         Application filed August 19, 1921. Serial No. 493,713.

*To all whom it may concern:*

Be it known that I, FRITZ GÜNTHER, citizen of Germany, residing at Ludwigshafen-on-the-Rhine, Germany, have invented new and useful Improvements in the Manufacture of Thymol, (for which I have made application in Germany, No. B. 94,890, IV 112 q., July 3, 1920,) of which the following is a specification.

The invention relates to a process for the synthetic manufacture of thymol (1-methyl-4-isopropyl-3-hydroxybenzene) which is very simple and which can also be carried out on a commercial scale. This process consists in sulfonating meta-cresol, treating the meta-cresol-sulfonic acid so obtained with isopropyl-alcohol and sulfuric acid, preferably effected at a raised temperature and with the sulfuric acid concentrated and finally splitting off the sulfonic group in the usual, or any suitable manner. The thymol which is obtained by distillation is soluble in caustic soda lye either completely or with the exception of very small traces.

In order to further explain the nature of my invention, I give the following example, but the invention is not limited thereto. The parts are by weight.

*Example.*

875 parts of monohydratic sulfuric acid are gradually introduced into 540 parts of meta-cresol, care being taken that the temperature does not exceed about 100 degrees centigrade. After all of the monohydrate has run in, the mixture is kept at 100 degrees centigrade for two hours, then cooled to about 85 degrees centigrade at which temperature a mixture of 350 parts of isopropyl-alcohol and 875 parts of monohydratic sulfuric acid, prepared at a low temperature, is added drop by drop over a space of 40 minutes. When all has been added, stirring is continued while maintaining the same temperature for about 3-4 hours whereupon the reaction mass is cooled, mixed with 1750 parts of water and distilled with steam at from 120 to 130 degrees centigrade, whereby the sulfonic group is split off and thymol distilled over with the water vapor. The oil obtained is worked up in the usual manner and can be separated from small traces of isopropyl-ether compounds, for example by means of caustic alkali. The product is subjected to fractional distillation, preferably in vacuo, and separated thereby from first-runnings consisting of unaltered meta-cresol and after-runnings containing a product crystallizing from benzene in splendidly formed large odorless crystals, melting at 114-115 degrees centigrade and very likely representing a thymol-isomer, whilst the middle fraction, when cooled and inoculated with a thymol crystal, soon solidifies to a crystalline mass, which, if necessary, can easily be purified further for example from ligroin by recrystallization.

The melting point of the synthetic product obtained according to this invention is 50-51 degrees centigrade.

I claim:—

1. The process of manufacturing thymol synthetically which consists in treating sulfonated meta-cresol with isopropyl-alcohol and strong sulfuric acid, then splitting off the sulfonic group.

2. The process of manufacturing thymol synthetically which consists in treating sulfonated meta-cresol with isopropyl-alcohol and strong sulfuric acid, then splitting off the sulfonic group by heating with sulfuric acid and water.

3. The process of manufacturing thymol synthetically which consists in treating sulfonated meta-cresol with isopropyl-alcohol and strong sulfuric acid, then splitting off the sulfonic group and subjecting the product to fractional distillation.

In testimony whereof I have hereunto set my hand.

FRITZ GÜNTHER.